Patented June 22, 1926.

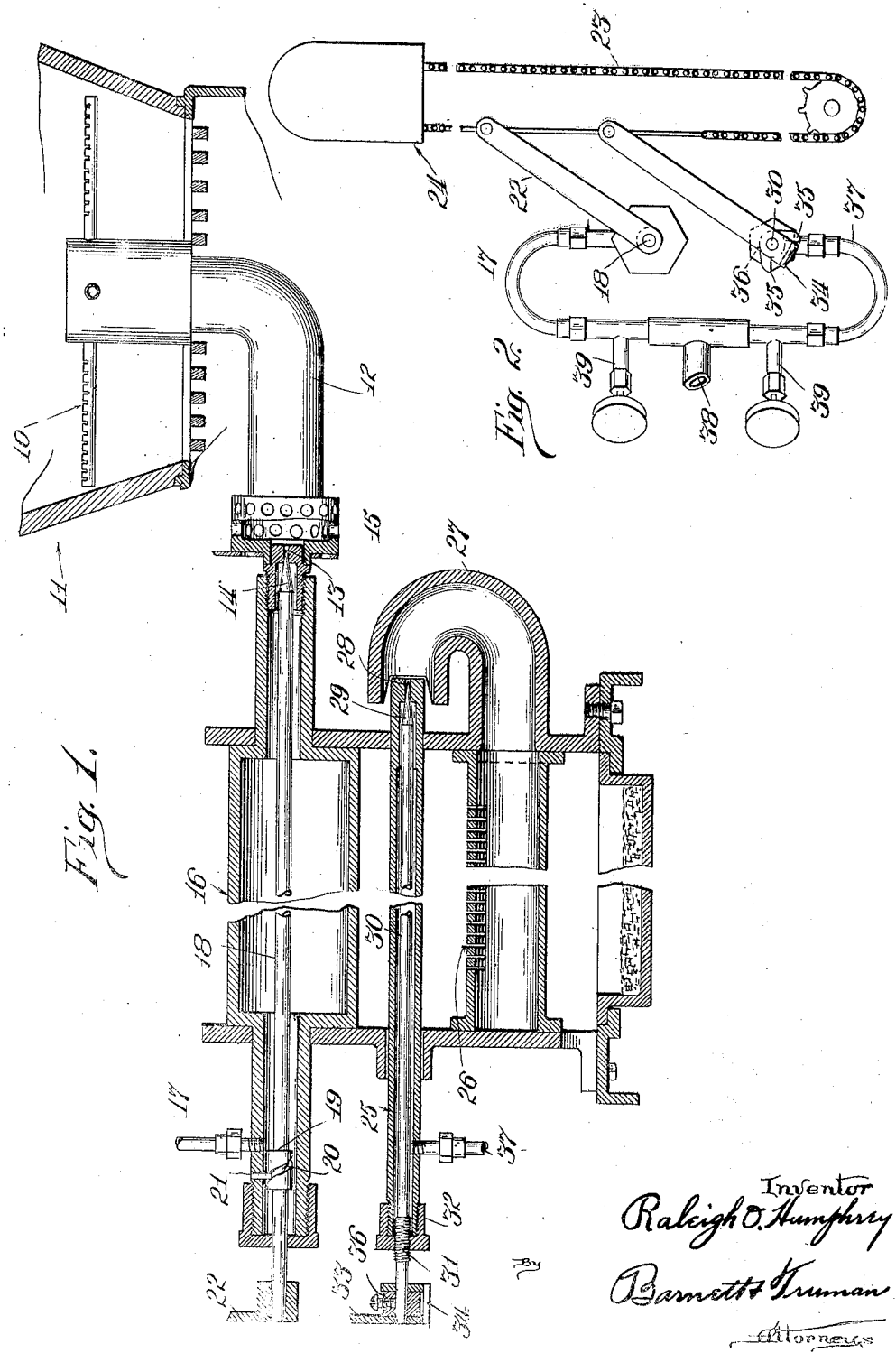

1,589,698

UNITED STATES PATENT OFFICE.

RALEIGH O. HUMPHREY, OF CHICAGO, ILLINOIS, ASSIGNOR TO AMERICAN AUTOMATIC HEATING COMPANY, A CORPORATION OF DELAWARE.

COMBUSTION OF HYDROCARBON OIL.

Application filed May 15, 1922. Serial No. 560,878.

My invention relates to the combustion of hydrocarbon oils, particularly petroleum distillates, such, for example, as kerosene oil; and one of the principal objects of the invention is to provide a method of vaporizing the oil and burning the same under such conditions that there will be no appreciable deposit of carbon in the vaporizer or other parts of the heating apparatus and the vapor will be delivered to the burner in a state insuring perfect combustion.

A further object is to so control the heat applied to the oil that complete vaporization without formation of carbon is obtained regardless of whether the furnace is operated at full or reduced capacity.

A heating plant constructed and operated in accordance with my invention will require very little care and attention, fuel consumption is minimized and, by suitable adjustment of the apparatus which may be effected automatically, if desired, a wide range of furnace temperatures can be produced. The invention, is, therefore, particularly applicable to domestic heating plants or to industrial furnaces where the requirements for heat are not constant but, as in the case of a house heating plant, will vary with the conditions of the weather. The invention, however, is not confined to plants of this type.

I have found that petroleum distillates, for example, the distillate known as kerosene, may be vaporized and heated to the extent required to give perfect combustion without producing any appreciable deposit of carbon in the vaporizer, provided the oil is heated to a certain temperature but not too highly, that is, provided the temperature of the oil is kept between certain fairly well defined limits (with ordinary kerosene between 500° and 800° Fahrenheit). That is to say, the oil if heated to this temperature will be converted into a vapor without any decomposition or breaking up of the oil into its hydrogen and carbon elements, and the vapor superheated to compensate for radiation losses between the vaporizer and burner and for the drop in temperature due to mixture of air with the vapor, so that no carbon is formed in the vaporizer and so that the fuel mixture delivered to the burner will be completely combustible and burn without any residue.

In utilizing this principle in a furnace such as a domestic heating plant which is called upon to deliver larger or smaller amounts of heat according to the weather conditions or as between the day and night hours, I vary the quantity of heat applied to the vaporizer (for example, by varying the fuel supply to the burner which heats the vaporizer) substantially in proportion to the change in rate of oil flow through the vaporizer, so that whether the furnace burner be operated at a maximum capacity or at any reduced capacity down to the minimum, the temperature to which the oil in the vaporizer is raised will remain constant or at least will remain within such range of temperatures as will insure complete vaporization without bringing about decomposition and deposit of carbon.

The regulation of the amount of heat applied by the burner to the vaporizer to accomplish this result may be brought about in various ways. In the drawing attached hereto I have shown the vaporizer as heated by a burner fed with oil vapor produced in an auxiliary vaporizer simultaneously with the production of vapor in the main vaporizer, the oil supply to the two vaporizers being controlled so as to keep them both at the desired temperature regardless of the amounts of fuel passing through the same. For a house heating plant the control of the fuel supply passing through the main vaporizer and the fuel supply passing through the auxiliary vaporizer may be controlled, simultaneously, by means of a thermostat located in the space to be heated.

A further object of the invention is to provide a suitable apparatus for carrying out the method above set forth.

The annexed drawing illustrates somewhat diagrammatically, an apparatus for utilizing my invention, Fig. 1 being a fragmentary vertical sectional view of the apparatus, and Fig. 2 an end elevation of the vaporizer to illustrate control of the same thermostatically.

Referring to the drawing, 10 designates a burner of the Bunsen type which is shown as arranged in the fire pot 11 of a furnace. Vaporized fuel enters the mixing chamber 12 of the burner through a port 13 controlled by a valve 14. Air enters the mixing chamber through perforations 15.

16 is the main vaporizer and 17 the oil supply pipe leading thereto. The stem 18 of valve 14 extends through the vaporizer and is provided with a collar 19 formed with a spiral groove 20 into which projects the fixed stud 21. 22 is a lever fixed to the end of stem 18, the end of which lever is connected with a chain 23 forming part of a thermostatic mechanism indicated diagrammatically at 24. 25 designates the auxiliary vaporizer and 26 a burner for heating both the main vaporizer and the auxiliary vaporizer, the burner 26 being supplied with oil vapor from the vaporizer 25 through a gooseneck 27. The end of the auxiliary vaporizer which projects into gooseneck 27 is formed with a vapor port 28 controlled by a valve 29, the stem 30 of which extends through the vaporizer and has a threaded portion 31 engaging a threaded bonnet 32. 33 is a lever, also attached to the thermostat chain 23, for rotating stem 30. In order that threading of valve 29 need not be extremely fine, lever 33 may be pivoted to the end of stem 30 and provided with a projection 34 which works with some lost motion between lugs 35, 35 on a collar 36 fixed to stem 30. 37 is the oil supply pipe leading to the auxiliary vaporizer, this pipe and pipe 17 being branches from a common oil supply pipe 38 and being provided, preferably, with shut off valves 39, 39.

The movement of the valve 14 away from its seat is much more rapid than the corresponding movement of valve 29. These valve movements and the relative sizes of the ports controlled by them are calculated so that the amount of vapor delivered from the auxiliary vaporizer to the burner, and consequently the amount of heat applied to the vaporizers by the burner, is proportioned to the rate of flow of fuel through the vaporizers, with the result that the oil, regardless of its rate of flow, is maintained at an approximately constant temperature, at least at a temperature within the range of temperatures sufficiently high to produce a completely vaporized fuel at the furnace burner 10, but low enough so that there is no decomposition of the oil and deposit of carbon. In case the temperature of the space being heated falls below that at which the thermostat 24 is set to operate, the action of the thermostat will increase the flow of fuel through the vaporizer 16 by operation of valve 14. At the same time valve 29 is automatically operated to supply vapor to the burner 26 in a proportionately increased quantity so that as the rate of flow of oil through the vaporizers is increased the temperature to which the oil is exposed is higher. Similarly, a slowing down of the fuel to the furnace burner is accompanied by a reduction of fuel supply to the burner that heats the vaporizers, so that the slower movement of the fuel does not involve raising it to a higher temperature.

By "complete vaporization", as the term is used in the claims, I intend the production of an oil vapor in the vaporizer which will be superheated to the extent necessary to insure the delivery of a vapor which, being mixed with air, will give a perfect blue flame combustion, leaving no carbon deposit. The term "decomposition" as applied to the oil is intended to express the chemical change which takes place in the oil when subjected to high temperature whereby deposits of carbon are formed.

It is realized that the invention might be utilized in apparatus very differently constructed from that shown in the drawing. Therefore I wish to be understood as intending to cover all modifications, both as to process and apparatus, within the scope of the appended claims.

I claim:

1. Method of heating with a petroleum distillate as a fuel which consists in producing a flow of the fuel to the place of combustion, heating the oil to vaporize it, thermostatically controlling the flow of fuel to maintain a determinate temperature in the space heated, and automatically controlling the amount of heat applied to the oil only in response to extreme changes in its rate of flow to maintain the oil at a temperature above that necessary for complete combustion but below that at which decomposition of the oil takes place.

2. Apparatus for burning petroleum oil distillate comprising, in combination, a burner of the Bunsen type, a vaporizer, means for varying the flow of oil through the vaporizer, means for heating the vaporizer, and means cooperating with the fuel controlling means only in case of extreme changes in the rate of fuel flow for automatically regulating the means for heating the vaporizer to maintain the oil in the vaporizer at the proper temperature for complete combustion, without allowing same to become overheated and decomposed.

3. Apparatus for burning petroleum oil distillate comprising, in combination, a burner of the Bunsen type, a vaporizer, means for varying the flow of oil through the vaporizer, means for heating the vaporizer, and automatic means cooperating with the fuel controlling means and including a lost-motion connection, for regulating the means for heating the vaporizer simultaneously with extreme changes in the rate of flow through the vaporizer to maintain the oil in the vaporizer at the proper temperature for complete combustion, without allowing same to become overheated and decomposed.

4. In a hydrocarbon burner, the combination with a main vaporizing generator having a control valve for the vaporized fuel delivered therefrom; of an auxiliary vaporizing generator having a control valve for vaporized fuel delivered therefrom; means for operating said main generator control valve through the normal range of adjustment, and for simultaneously operating the auxiliary generator control valve during extreme adjustments of the main valve; a burner proper; and means for supplying vaporized fuel from said auxiliary generator to said burner proper.

5. In a hydrocarbon burner, the combination with a main vaporizing generator having a control valve for the vaporized fuel delivered therefrom; of an auxiliary vaporizing generator having a control valve for the vaporized fuel delivered therefrom; means for simultaneously actuating said control valves in the same direction and one at a faster rate than the other; a burner proper; and means for supplying vaporized fuel to said burner proper.

6. In a hydrocarbon burner, the combination with a main vaporizing generator having a control valve for the vaporized fuel delivered therefrom; of an auxiliary vaporizing generator having a control valve for vaporized fuel delivered therefrom; means for simultaneously actuating said control valves and including a lost motion device for the auxiliary generator control valve; a burner proper; and means for supplying said burner proper with vaporized fuel.

7. In a hydrocarbon burner, the combination with a main generator having a control valve for vaporized fuel delivered therefrom with means for advancing or retracting said valve at a relatively fast rate of speed upon rotation of the valve; of an auxiliary vaporizing generator having a control valve for vaporized fuel delivered therefrom and means for advancing and retracting said valve at a relatively slow rate upon rotation thereof; means for simultaneously actuating said control valves in the same direction and including a lost motion device for the auxiliary generator valve; a burner proper; and means for supplying said burner proper with vaporized fuel.

RALEIGH O. HUMPHREY.